J. R. FLEMING.
AXLE BOX.
APPLICATION FILED AUG. 19, 1907.

902,956.

Patented Nov. 3, 1908.

WITNESSES:
M. E. Verbeck.

INVENTOR
James R. Fleming
BY
Eugene Owen
ATTORNEY

UNITED STATES PATENT OFFICE.

JAMES R. FLEMING, OF SCRANTON, PENNSYLVANIA.

AXLE-BOX.

No. 902,956.

Specification of Letters Patent.

Patented Nov. 3, 1908.

Application filed August 19, 1907. Serial No. 389,124.

*To all whom it may concern:*

Be it known that I, JAMES R. FLEMING, a citizen of the United States, residing at Scranton, in the county of Lackawanna and State of Pennsylvania, have invented certain new and useful Improvements in Axle-Boxes, of which the following is a specification.

This invention relates to improvements in axle boxes for mine cars, trucks, and the like; my object being to provide a box adapted more particularly for use where the car sills are positioned over the axles between the wheels.

A further object is to provide means for locking the axle block, or brass, within the box, where an open ended lubricant holding member is employed to close the bottom of the box.

I attain my objects by constructing the several parts of the axle box as herein described, and as illustrated in the accompanying drawings, in which—

Figure 1:
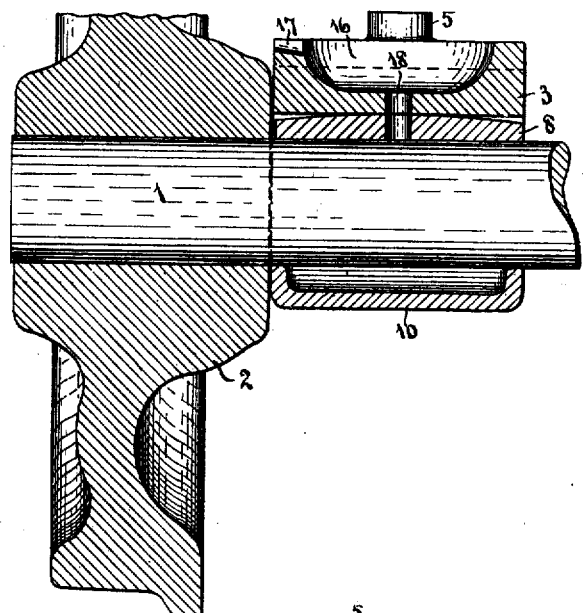
Figure 2:
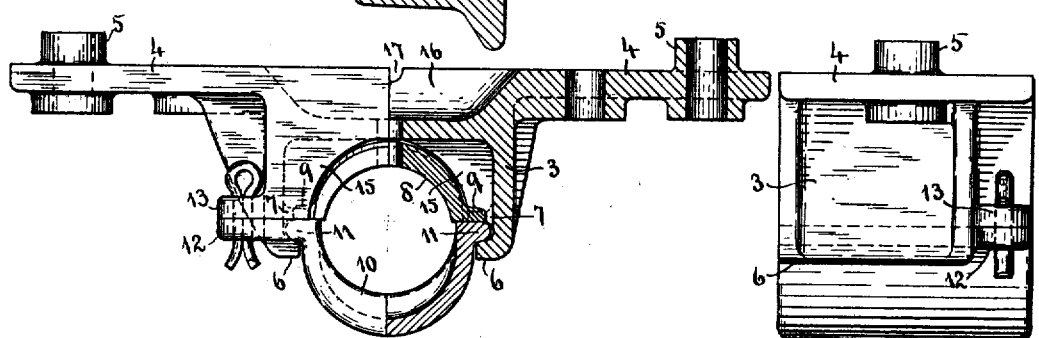
Figure 3:
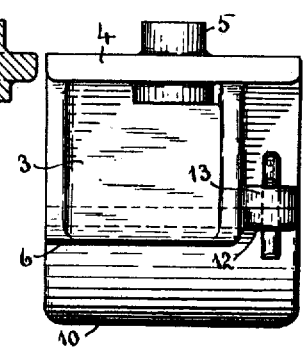
Figure 4:
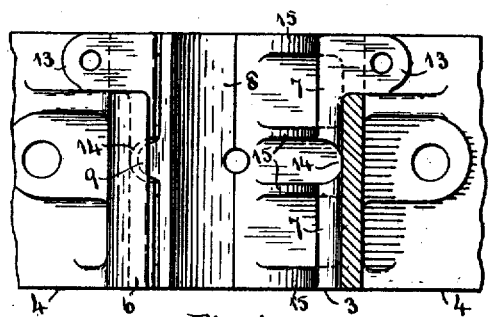
Figure 5:
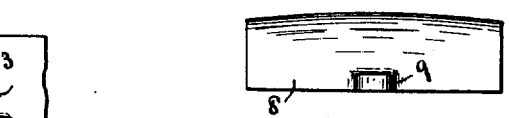

Figure 1 represents a partial view of a car wheel and axle with my improved axle box applied thereto, and shown in transverse section; Fig. 2, a side view of the box with one-half shown in mid section; Fig. 3, an end elevation of the box; Fig. 4, a view of the under side of the box, with the lubricant holding member removed and parts at one side shown in section; Fig. 5, a side elevation of the axle block, or brass, to be used in this box; and Fig. 6, an end view of the same.

Like numerals designate like parts in the several views.

In cars of this character, where the side sills are mounted on the axles inside of, or between the wheels, each axle 1 will have a wheel 2, shrunk or otherwise rigidly fastened upon each end thereof, and the axle boxes must be so constructed that the axles and wheels may be readily removed for purposes of renewal and repairs. With this end in view my axle box consists of the body portion 3 provided at the top with horizontal wings 4, which are to be applied to the under side of the car sill; and in order to position the box upon the sill so as to prevent side or end movement thereof, these side wings are supplied with upwardly projecting bosses 5, adapted to be inserted in corresponding holes or sockets bored in the under side of the sill. These bosses are preferably to be provided with bolt holes through which the bolts, by which the boxes are fastened to the sills, may be passed. Other bolt holes may be provided in the wings 4 to receive additional bolts, or for use where bolts cannot be used at the bosses.

At its lower side the box 3 is provided with inturned parallel flanges 6 and 7, by which grooves are formed to receive the tongues 11, formed at each side of the cap, or lubricant holding member 10, said member being provided at the inward end of the box with ears 12, which, when said member is in place, register with ears 13 formed on the box; split pins being inserted through said ears to fasten the lubricant holding member in place.

Figure 6:
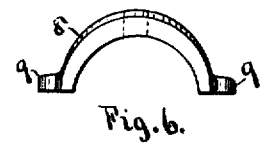

The axle block or brass 8 is provided at each side with ears 9 adapted to be inserted by way of the grooves between flanges 6 and 7 into recesses 14, provided therefor in the upper flanges 7; the block being thus locked in the axle box against endwise motion in either direction when the lubricant holding member is in place. These ears 9 will preferably be made slightly smaller than the recesses 14, and the outward surfaces of the block will be arched, as shown in Figs. 1, 5, and 6, in order that the block may be free to rock in the box to accommodate the blocks to the axle, and prevent binding and the consequent cutting out of the axle. The curved ribs 15 are cast on the inside of the box to receive the axle block.

To lubricate the axle a chamber 16 is formed in the casting over the axle box, said chamber being closed by the car sill when the box is in place. This chamber will be filled with waste or other suitable lubricant holding material, and oil will be supplied from time to time through an opening 17 at the outward side of the box, or other suitable hole drilled into the chamber 16 through the sill. Central holes at 18 are provided in the bottom of chamber 16 and the axle block through which the oil passes to the axle, the surplus oil being caught and held in the lubricant holding member 10, which is chambered out at the bottom for this purpose.

When the boxes are in place on the car sills, the axles will be set in the boxes by jacking up, or otherwise raising the car sufficiently for the axles to be run under on the wheels into position beneath the boxes; the caps, or lubricant holding members being removed, and the axle blocks or brasses being in place in the boxes. While this is being done, the ears at the sides of the blocks rest upon the flanges 6 and hold the blocks in place, said ears rising into the recesses 14 as the car is lowered upon the axle. To insert the blocks in the boxes, the ears are so made as to be slipped into place beneath the recesses 14 through the grooves. When the boxes are properly positioned on the axles, the members 10 are inserted in the grooves and fastened in place by the split pins. To remove the axles and blocks for renewal or repairs, the above procedure is simply reversed.

Without confining myself strictly to the construction illustrated and described herein, what I claim as my invention and desire to secure by Letters Patent is—

An axle box open at the ends and bottom, the sides of the box near the bottom being provided at the inside with horizontal grooves, an axle block provided with ears at each side adapted to be inserted through said grooves into recesses provided therefor in the box sides above and opening into the grooves, said ears being engaged upon both sides by the walls of said recesses, a cap fitted to the axle beneath the box and having tongues at its upper edges adapted to slide into said grooves, means for fastening the cap in place, and means for fastening the box to a car sill.

In testimony whereof I have affixed my signature, in presence of two witnesses.

JAMES R. FLEMING.

Witnesses:
 THOS. F. HANAHUE,
 JAMES J. O'MALLEY.